United States Patent [19]

Ratcliff, Jr. et al.

[11] 4,252,064
[45] Feb. 24, 1981

[54] CAR SHIFTING APPARATUS

[75] Inventors: Edward H. Ratcliff, Jr., Millersburg; Terry E. Rader, Lexington, both of Ky.

[73] Assignee: The W. R. Stamler Corporation, Millersburg, Ky.

[21] Appl. No.: 63,957

[22] Filed: Aug. 6, 1979

[51] Int. Cl.³ .............................................. B60J 3/08
[52] U.S. Cl. .................................................. 104/162
[58] Field of Search ............... 104/162, 163, 176, 173; 91/173

[56] References Cited

U.S. PATENT DOCUMENTS

| | | | |
|---|---|---|---|
| 2,572,687 | 10/1951 | Anderson et al. | 104/162 |
| 3,377,961 | 4/1968 | Hunt | 104/162 |
| 3,696,754 | 10/1972 | Anderson et al. | 104/162 |
| 4,038,927 | 8/1977 | Evans | 104/162 |

Primary Examiner—Richard A. Bertsch
Attorney, Agent, or Firm—Frank C. Leach, Jr.

[57] ABSTRACT

Resiliently biased dogs of a car shifting apparatus are automatically moved by double acting hydraulic cylinders to positions in which the dogs cannot engage any car moving along a predetermined path. When this occurs, movement of the dogs from these non-obstructing positions and movement of barneys, which have the dogs pivotally mounted thereon, along the predetermined path are prevented.

10 Claims, 9 Drawing Figures

CAR SHIFTING APPARATUS

U.S. Pat. No. 3,696,754 to Anderson et al relates to a variable-stroke car shifting apparatus having a pair of dogs for engaging axles of each car to be shifted. The dogs alternately engage the axles with each of the dogs being mounted on a hydraulic driven barney.

The car shifting apparatus of the aforesaid Anderson et al patent may be utilized with any type of track on which cars may ride through being disposed between the rails of the track. When used with a dead end track, for example, in which the cars must be returned past the apparatus in the opposite direction to that in which they were advanced by the car shifting apparatus of the aforesaid Anderson et al patent, it is necessary to dispose each of the dogs out of the path of movement of the car. This has previously been accomplished by a person forcing the dog physically downwardly to a non-obstructing or inactive position in which it does not obstruct movement of the car in the opposite direction to which the car was advanced by the car shifting apparatus of the aforesaid Anderson et al patent and then utilizing suitable holding means such as a pin, for example, to hold the dog in this non-obstructing position.

While this arrangement works satisfactorily, it required the operator, who has been shifting each of the cars with the car shifting apparatus of the aforesaid Anderson et al patent, to leave a control tower to accomplish this or to have a second person perform this function. In either situation, this is a time-consuming operation.

The present invention overcomes the foregoing problem through providing an arrangement in which the dogs can be moved to the non-obstructing position by the operator without the operator having to leave the control tower or requiring a second person. Thus, the present invention is an improvement of the apparatus of the aforesaid Anderson et al patent.

The present invention utilizes an arrangement in which each of a pair of double acting hydraulic cylinders has its piston rod connected to means for moving one of the dogs to its non-obstructing position. The hydraulic supply system for the pair of cylinders prevents movement of the piston rod of each of the double acting cylinders beyond the position in which the cooperating dog is moved to its non-obstructing position.

Additionally, the hydraulic supply system of the present invention prevents any accidental raising of either of the dogs due to leakage of hydraulic pressure. Thus, the dogs cannot be moved from the non-obstructing or inactive position to the car engaging position without activation by the operator.

Furthermore, the improvement of the present invention prevents any movement of the barneys, which support the dogs and move along predetermined paths between the rails, until both of the dogs are fully raised to their car engaging positions and the piston rods of both of the double acting cylinders have been fully retracted. Thus, the operator cannot cause movement of the barneys until the dogs are in their car engaging positions.

An object of this invention is to provide a mechanism for remotely moving the car engaging means of a car shifting apparatus.

Another object of this invention is to provide an improved car shifting apparatus.

Other objects of this invention will be readily perceived from the following specification, drawings, and claims.

This invention relates to an improvement in an apparatus for shifting a trip of cars along a predetermined path including first and second movable means with each having engaging means for engaging a car to be shifted and means to control movement of the first movable means and the second movable means so that only one of the first and second movable means moves the car to be shifted at any time. The improvement comprises moving means to move the engaging means of each of the first movable means and the second movable means from a car engaging position to an inactive position in which the engaging means cannot be contacted by any car moving along the predetermined path and means to prevent movement of each of the first movable means and the second movable means unless the moving means is in a position in which the engaging means of each of the first movable means and the second movable means is in its car engaging position.

The attached drawings illustrate a preferred embodiment of the invention, in which.

Figure 2:
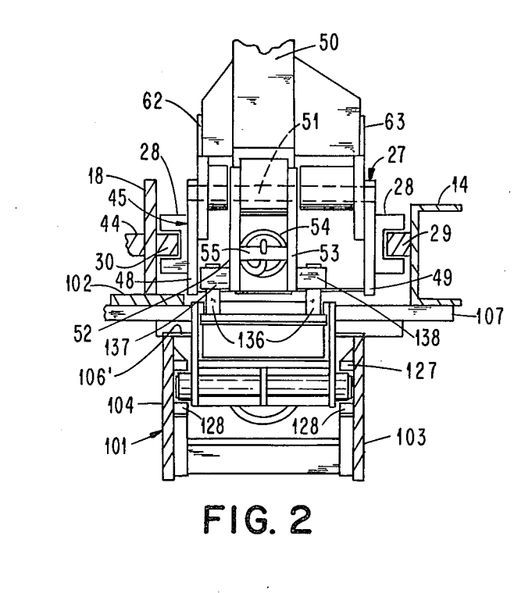
FIG. 2 is a elevational view, partly in section, of the dog lowering mechanism of FIG. 1 and taken along line 2—2 of FIG. 1.
Figure 6:
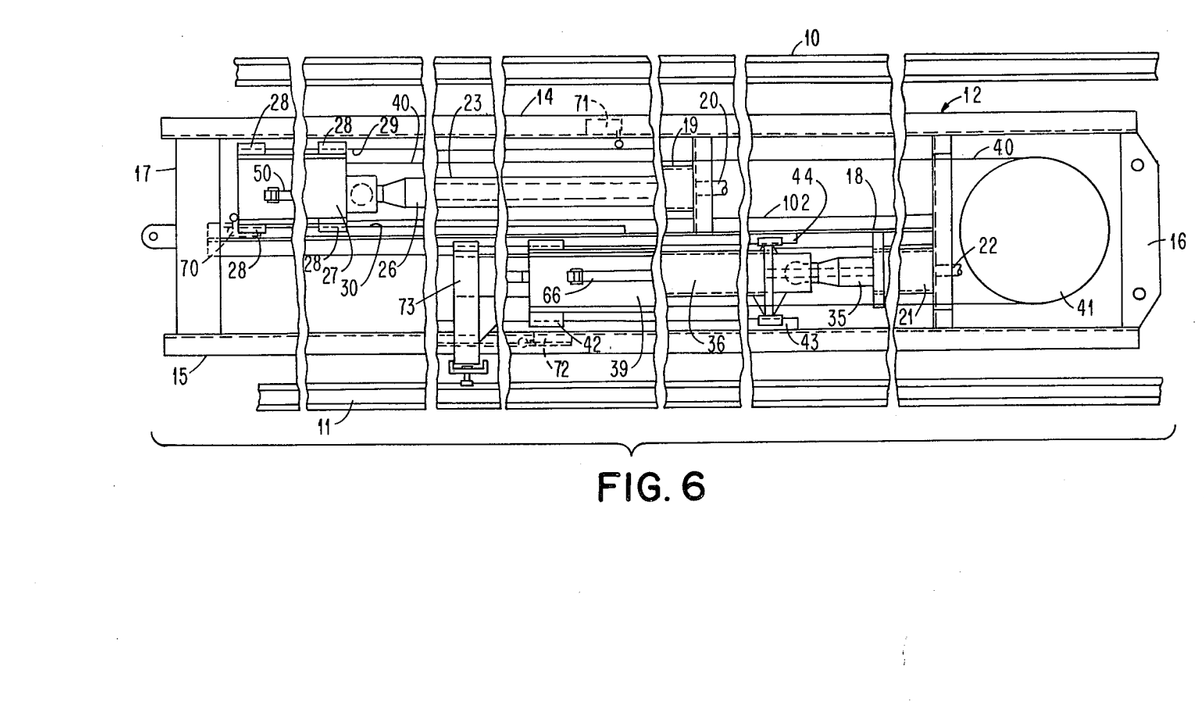
FIG. 6 is a top plan view of a portion of a car shifting apparatus with which the dog lowering mechanism of the present invention is employed.

Referring to the drawings and particularly FIG. 6, there is shown a pair of substantially parallel rails 10 and 11 of a track upon which cars are supported for shifting. A supporting frame 12 is disposed between the rails 10 and 11. The frame 12 includes a pair of parallel side guides 14 and 15, which are U-shaped channels resting on one of the side legs as shown in FIG. 2 for the guide 14, a rear end member 16, and a forward end member 17. A center guide 18 extends substantially parallel to the guides 14 and 15 and is fixed in position. The center guide 18 is substantially parallel to the guides 14 and 15.

A stationary single-acting cylinder 19, which is called the right-hand cylinder in accordance with the direction of advance of the cars, is rigidly mounted between the guides 14 and 18. The cylinder 19 has a fluid connection 20 at its rear end.

A stationary single-acting cylinder 21 is rigidly mounted between the guides 15 and 18 and is suitably displaced longitudinally from the cylinder 19. The cylinder 21, which is the left-hand cylinder, has a fluid connection 22 at its rear end.

Figure 4:
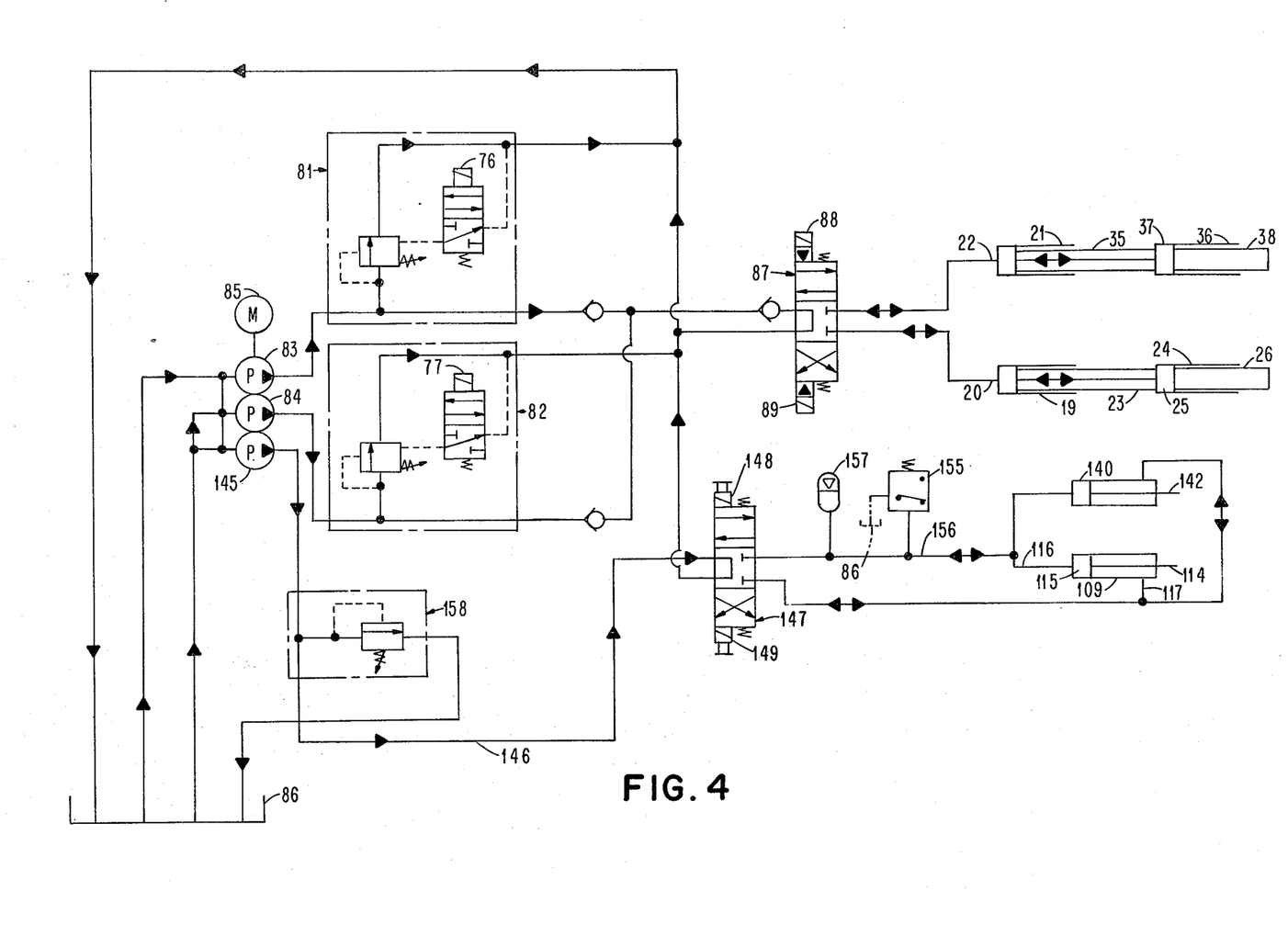
FIG. 4 is a schematic diagram of a hydraulic circuit used with the dog lowering mechanism of the present invention.

As more particularly shown and described in the aforesaid Anderson et al patent, a hollow piston rod 23 is attached at one end to a hollow piston within the cylinder 19 with the hollow piston rod 23 being connected through an articulating joint to a movable cylinder 23 (see FIG. 4). The movable cylinder 24 has a solid piston 25 disposed therein with a piston rod 26 projecting therefrom for connection, in the manner shown and described in the aforesaid Anderson et al patent, to a barney 27 (see FIG. 6).

As shown and described in the aforesaid Anderson et al patent, the barney 27 has pivoted shoes 28 at its sides. The shoes 28 slide on ribs 29 (see FIG. 2) and 30 on the guides 14 and 18, respectively.

Similarly, a hollow piston rod 35 (see FIG. 6) is connected to a movable cylinder 36 so as to supply fluid from the connection 22 through the cylinder 21 to the interior of the movable cylinder 36. The movable cylinder 36 has a solid piston 37 (see FIG. 4) disposed therein with a piston rod 38 projecting therefrom for connection, in the manner shown and described in the aforesaid Anderson et al patent, to a barney 39 (see FIG. 6).

The barney 39 is connected to the barney 27 by a cable 40, which is preferably formed of steel, being attached to the end of each of the barneys 27 and 39. The cable 40 passes around a sheave 41, which is rotatably mounted on the supporting frame 12.

The barney 39 has pivoted shoes 42 on its sides. The shoes 42 slide on ribs 43 and 44 on the guides 15 and 18, respectively.

As more particularly shown and described in the aforesaid Anderson et al patent, the cable 40 results in one of the piston rods 26 and 38 (see FIG. 4) being retracted while the other is extended. Thus, the extension of one of the piston rods 26 and 38 advances the barney 27 (see FIG. 6) or 39 connected thereto.

Figure 1:
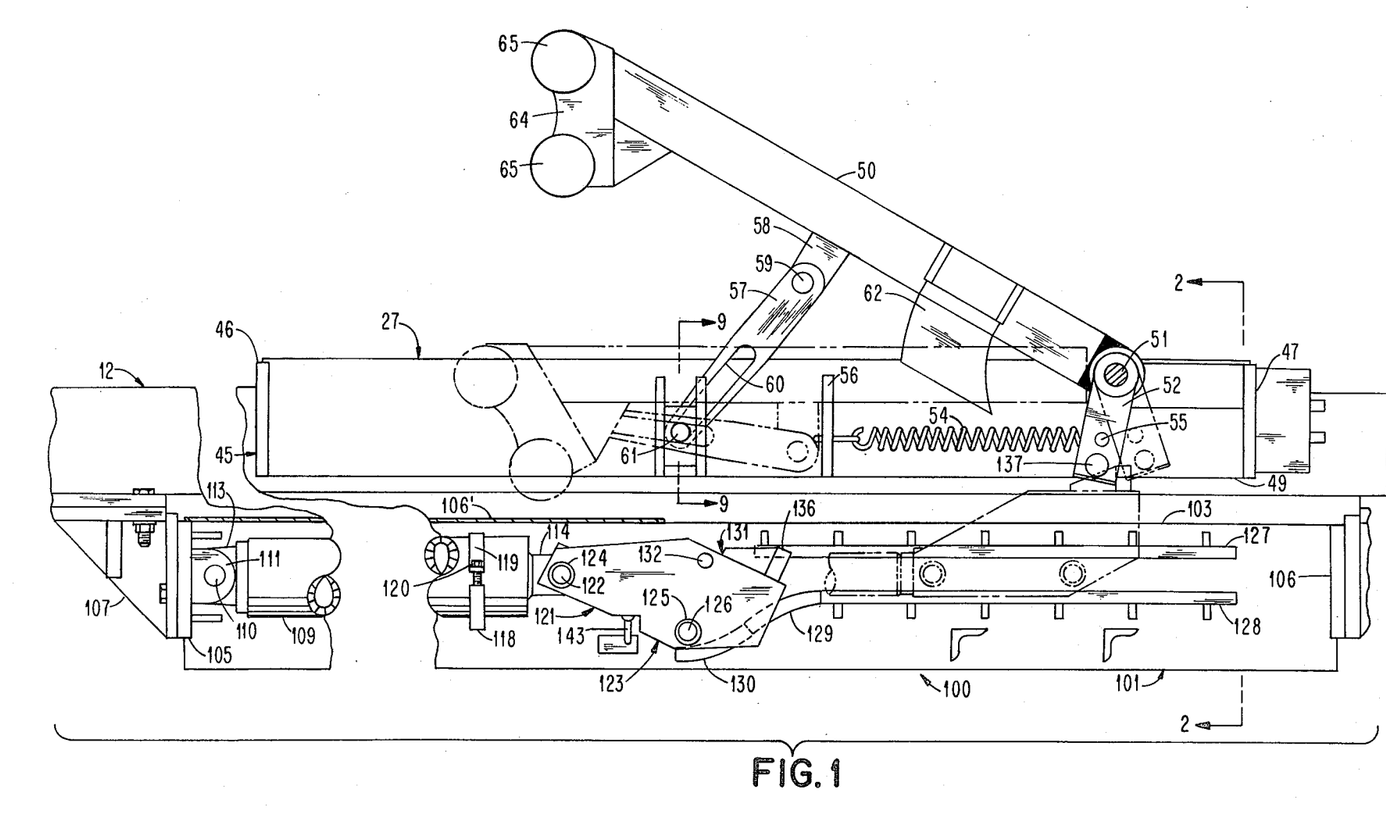
FIG. 1 is a side elevational view, partly in section, of a portion of a dog lowering mechanism of the present invention and a portion of a car shifting apparatus with which the dog lowering mechanism is used.

As more particularly shown and described in the aforesaid Anderson et al patent, the barney 27 includes a rigid box-like frame 45 (see FIG. 1). The frame 45 includes a front wall 46, a rear wall 47, and connecting side walls 48 (see FIG. 2) and 49. The shoes 28 are pivotally mounted on the side walls 48 and 49.

A dog 50 (see FIG. 1), which is an elongated member, is supported on the frame 45 of the barney 27 for pivotal movement between an elevated or car engaging position and a lowered or non-obstructing position. The dog 50 is pivotally retained by a pin 51, which is pivotally supported by the side walls 48 (see FIG. 2) and 49 of the barney frame 45, and is supported by the frame 45 of the barney 27. A pair of bell crank arms 52 (see FIG. 1) and 53 (see FIG. 2) is fixed to the dog 50 for pivotal movement about the pin 51.

A tension spring 54 (see FIG. 1) has one end connected to a pin 55, which extends between the bell crank arms 52 and 53 and is fixed thereto, and its other end anchored to a vertical plate 56, which is supported by the frame 45. The spring 54 urges the dog 50 to the raised (solid line) position of FIG. 1 to normally hold it in this car engaging position.

Figure 9:
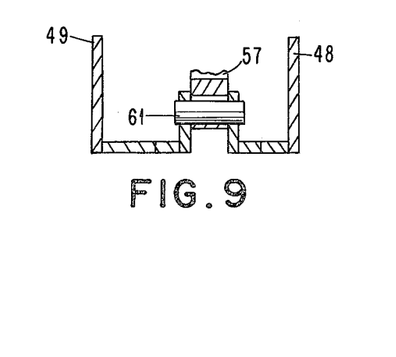
FIG. 9 is a sectional view of a pin support of the car shifting apparatus and taken along line 9—9 of FIG. 1.

The dog 50 has a depending arm 57 pivotally connected to an ear 58 on the dog 50 by a pin 59. The arm 57 has a slot 60 in its lower end to receive a pin 61, which is supported by the side walls 48 (see FIG. 9) and 49 of the barney frame 45. The engagement of the lower end of the slot 60 (see FIG. 1) with the pin 61 limits the elevated or car engaging position to which the dog 50 is moved by the spring 54 while permitting the dog 50 to be moved to its lowered or non-obstructing position (shown in phantom in FIG. 1) when desired.

The dog 50 has a pair of sleeves 62 and 63 (see FIG. 2) on opposite sides thereof and spaced therefrom. The sleeves 62 and 63 slide along the inner side walls 48 and 49 of the barney frame 45 to prevent side sway of the dog 50 during its movement between its lowered and raised positions.

At its forward end, the dog 50 has a support 64 for a pair of spaced rollers 65. As more particularly shown and described in the aforesaid Anderson et al patent, the rollers 65 engage an axle of the truck of the car, which is being pushed by the dog 50, so that the rollers 65 rotate with the axle.

The barney 39 (see FIG. 6) has a similar construction to the barney 27 and includes a dog 66. This is more particularly shown and described in the aforesaid Anderson et al patent.

As more particularly shown and described in the aforesaid Anderson et al patent, an end stroke limit switch 70, which is mounted on the guide 18, is disposed to be actuated by a portion of the barney 27 when the piston rods 23 and 26 (see FIG. 4) have reached their maximum extensions. A mid-stroke limit switch 71 (see FIG. 6), which is mounted upon the guide 14, is actuated by a portion of the barney 27, as more particularly shown and described in the aforesaid Anderson et al patent, at the rearward limit of movement of the barney 27 by the piston rods 23 and 26 (see FIG. 4) being fully retracted.

A variable stroke-control switch 72 (see FIG. 6), which is mounted on the guide 15, is actuated, as more particularly shown and described in the aforesaid Anderson et al patent, when a sensing means 73, which is mounted on the barney 39 for movement therewith as more particularly shown and described in the aforesaid Anderson et al patent, is depressed by a flange on a wheel of a car being moved along the rails 10 and 11. Accordingly, in a manner similar to that shown and described in the aforesaid Anderson et al patent, the switches 70, 71, and 72 cooperate to control the movement of the barneys 27 and 39 along paths parallel to the rails 10 and 11.

Figure 5:
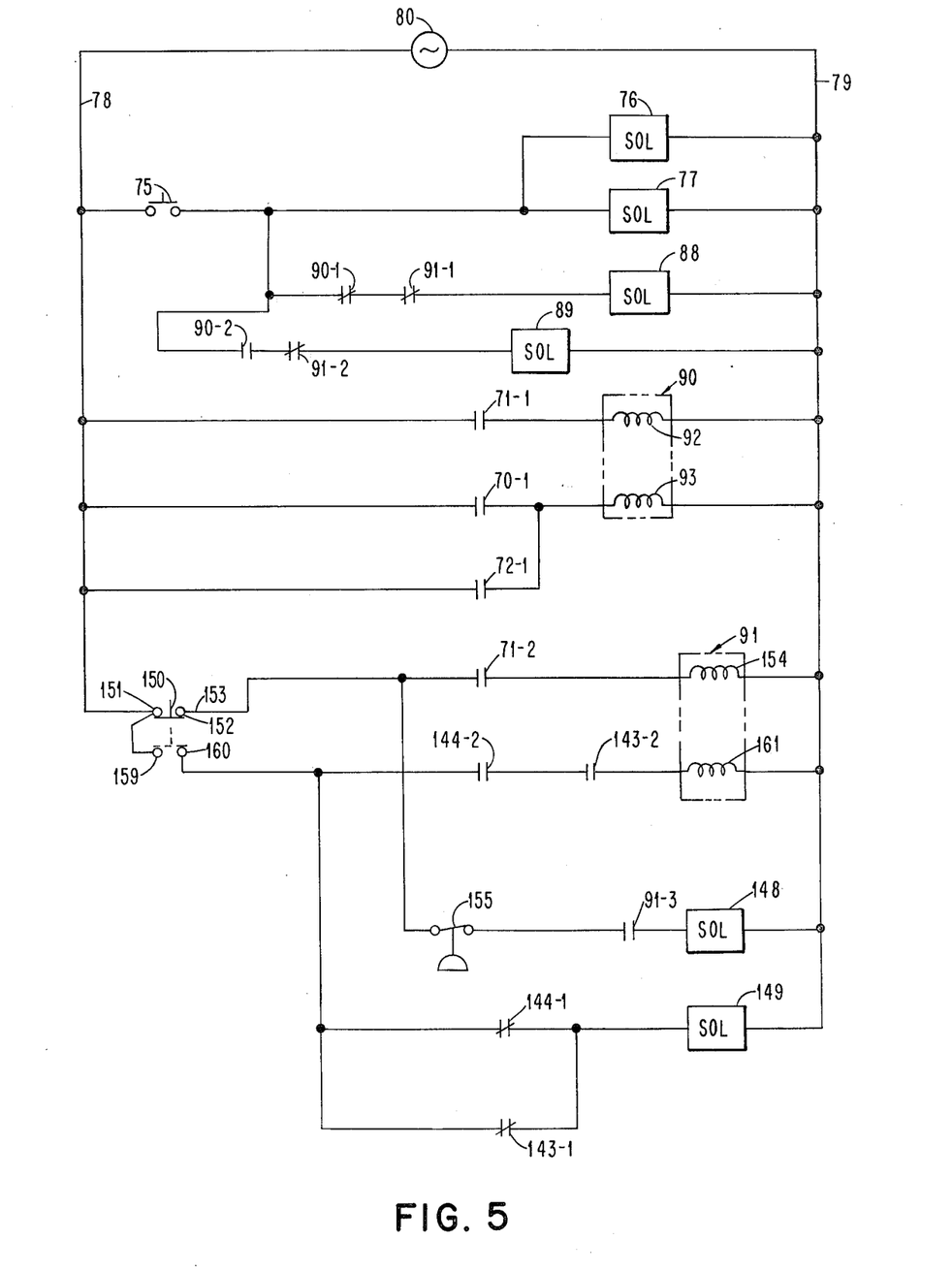
FIG. 5 is a schematic wiring diagram of an electrical circuit of the dog lowering mechanism of the present invention.

To cause the automatic advancement of each of the cars on the rails 10 and 11, a manual tram push button 75 (see FIG. 5) is closed by an operator. The closing of the tram push button 75 energizes a pair of tram solenoids 76 and 77 through connecting them to conductors 78 and 79, which are connected to an AC source 80.

Energization of the tram solenoids 76 and 77 moves solenoid controlled relief valves 81 (see FIG. 4) and 82, respectively, to a supply position. This enables pumps 83 and 84, which are driven by a motor 85, to supply hydraulic fluid froma reservoir 86 to a solenoid controlled, pilot operated, directional valve 87.

When a solenoid 88 is energized, the solenoid valve 87 is shited to supply pressurized hydraulic fluid through the connection 22 to the cylinder 21 and through the hollow piston rod 35 to the movable cylinder 36 whereby the barney 39 (see FIG. 6) is advanced. At the same time, hydraulic fluid is returned from the cylinders 24 (see FIG. 4) and 19 through the connection 20 to the reservoir 86 to allow retraction of the barnay 27 (see FIG. 6), which is connected to the barney 39 by the cable 40.

When a solenoid 89 (see FIG. 4) is energized, the solenoid valve 87 is shifted so that the pressurized hydraulic fluid from the pumps 83 and 84 is supplied through the connection 20 to the cylinders 19 and 24. At the same time, the fluid is removed from the cylinders 36 and 21 through the connection 22 to the reservoir 86. This results in the barney 27 (see FIG. 6) being advanced and the barney 39 being retracted.

When the tram push button 75 (see FIG. 5) is closed, the solenoid 88 is energized because it is assumed that normally closed contacts 90-1 of a latch relay 90 and normally closed contacts 91-1 of a latch relay 91 are closed to supply current through the solenoid 88. One suitable example of the latch relay 90 is a latch relay sold by Cutler Hammer as model D23MR112A. One suitable example of the latch relay 91 is a latch relay sold by Cutler Hammer as model D23MR122A.

As the barney 39 (see FIG. 6) advances, the barney 27 retracts because of the connection through the cable 40 to the barney 39 until the barney 27 engages the limit switch 71 to cause its normally open contacts 71-1 (see FIG. 5) to close. This energizes a latch coil 92 of the latch relay 90 to cause the normally closed contacts 90-1 of the latch relay 90 to open whereby the solenoid 88 is de-energized. Energization of the latch coil 92 of the latch relay 90 also causes normally open contacts 90-2 of the latch relay 90 to close whereby the solenoid 89 is energized since normally closed contacts 91-2 of the latch relay 91 remain closed at this time.

When this occurs, the solenoid valve 87 (see FIG. 4) shifts position to cause the hydraulic fluid to be supplied from the pumps 83 and 84 through the connection 20 to the cylinders 19 and 24. This advances the barney 27 (see FIG. 6) while the barney 39 is retracted.

Even though the latch coil 92 (see FIG. 5) of the latch relay 90 is de-energized as soon as the barney 27 (see FIG. 6) advances away from its rearwardmost position since the normally open contacts 71-1 (see FIG. 5) of the limit switch 71 (see FIG. 6) are no longer held closed, the contacts 90-1 (see FIG. 5) and 90-2 of the latch relay 90 remain in the states to which they have been shifted by activation of the latch coil 92 of the latch relay 90 until a release coil 93 of the latch relay 90 is energized to return the contacts 90-1 and 90-2 to their initial states.

This advancement of the barney 27 (see FIG. 6) and retraction of the barney 39 continues until the barney 39 causes activation of the switch 72 to close its normally open contacts 72-1 (see FIG. 5) through the sensing means 73 (see FIG. 6) on the barney 39 engaging a flange of a wheel on a car as more particularly shown and descried in the aforesaid Anderson et al patent. When this occurs, the release coil 93 (see FIG. 5) of the latch relay 90 is energized to cause the normally closed contacts 90-1 to close and the normally open contacts 90-2 to open. As a result, the solenoid 88 is energized and the solenoid 99 is de-energized to shift the position of the solenoid valve 87 (see FIG. 5) so that the direction of each of the barneys 27 (see FIG. 6) and 39 is reversed.

The normally closed contacts 90-1 (see FIG. 5) of the latch relay 90 will remain in this state until the latch coil 92 of the latch relay 90 is again energized even though the release coil 93 of the latch relay 90 is de-energized as soon as the direction of motion of each of the barneys 27 (see FIG. 6) and 39 is reversed. Similarly, the normally open contacts 90-2 (see FIG. 5) will remain in this state until the latch coil 92 of the latch relay 90 is again energized.

When there are no more cars to be advanced, retraction of the barney 39 (see FIG. 6) does not result in the sensing means 73 engaging a flange on a wheel of a car so that the barney 27 continues its advance until it engages the end limit switch 70. At this time, normally open contacts 70-1 (see FIG. 5) of the limit switch 70 (see FIG. 6) are closed to energize the release coil 93 (see FIG. 5) of the latch relay 90. This returns the contacts 90-1 and 90-2 of the latch relay 90 to their initial states. At this time, the operator would release the manual tram push button 75 for movement to its open position.

While each of the dogs 50 (see FIG. 6) and 66 can pass underneath a car when each of the barneys 27 and 39, respectively, is retracted, the dogs 50 and 66 will prevent movement of the cars in the opposite direction to that in which they have been advanced by the dogs 50 and 66. Therefore, if the cars are advanced on a dead end track, for example, it is necessary to lower the dogs 50 and 66 to return the cars past the dogs 50 and 66.

The dog lowering mechanism of the present invention includes an arrangement for retracting the dog 50 of the barney 27 and the dog 66 of the barney 39 to their non-obstructing positions. As shown in FIG. 1, a dog lowering mechanism 100 for the dog 50 of the barney 27 includes a rectangular shaped frame 101, which is mounted beneath the plane of the barney frame 45 of the barney 27 in a portion of the space between the guies 14 and 18 and is supported by the bottom leg of the guide 14 and a plate 102 (see FIG. 2) at the bottom of the guide 18.

Figure 3:
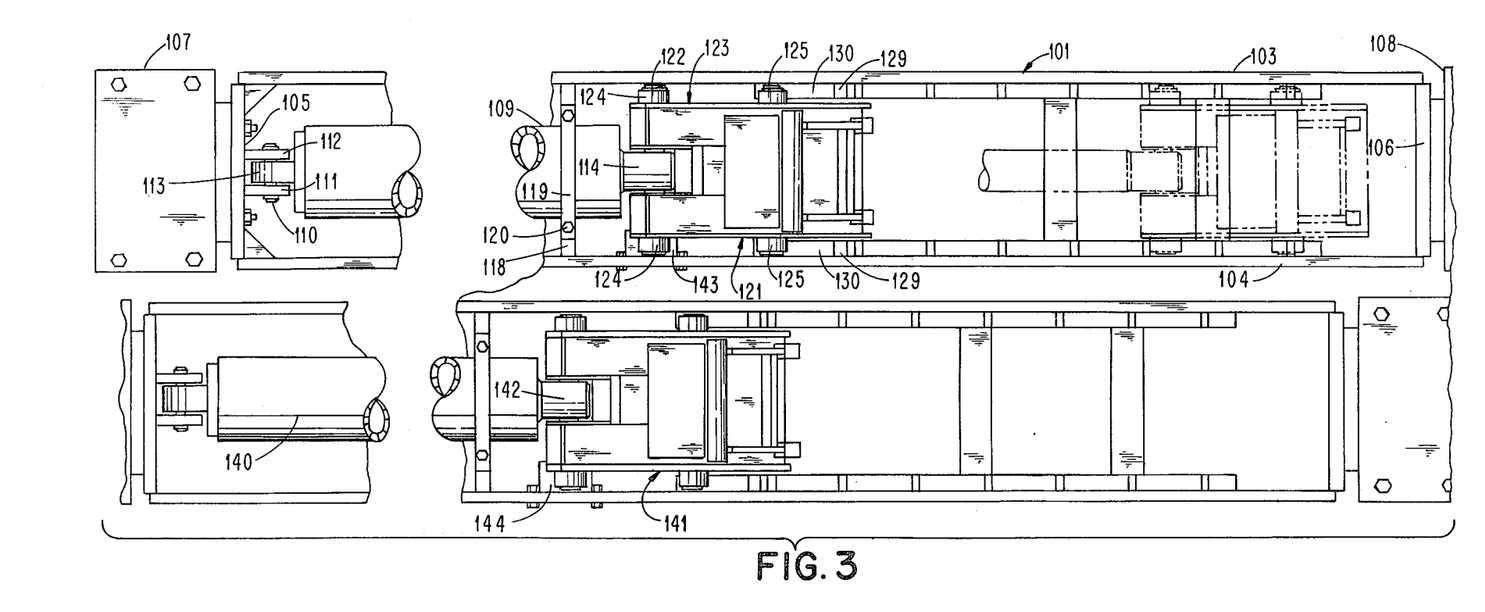
FIG. 3 is a top plan view of the dog lowering mechanism of the present invention for lowering both car engaging dogs with a top cover removed.

As shown in FIG. 3, the frame 101 includes a pair of substantially parallel side walls 103 and 104, a front end wall 105, a rear end wall 106, and a removable cover 106' (see FIG. 1). The front end wall 105 of the frame 101 has a brace 107 secured thereto for connection to the guide 14 (see FIG. 2) and the plate 102 of the guide 18. The rear end wall 106 (see FIG. 3) of the frame 101 has a brace 108 secured thereto for connection to the guide 14 (see FIG. 2) and the plate 102 of the guide 18.

A double acting cylinder 109 (see FIGS. 1 and 3) is pivotally connected to the front end wall 105 of the frame 101 by a pin 110 extending through aligned openings in a pair of plates 111 and 112, which are secured to the front end wall 105 of the frame 101, and an opening in an extension 113 on the cylinder 109.

Figure 7:
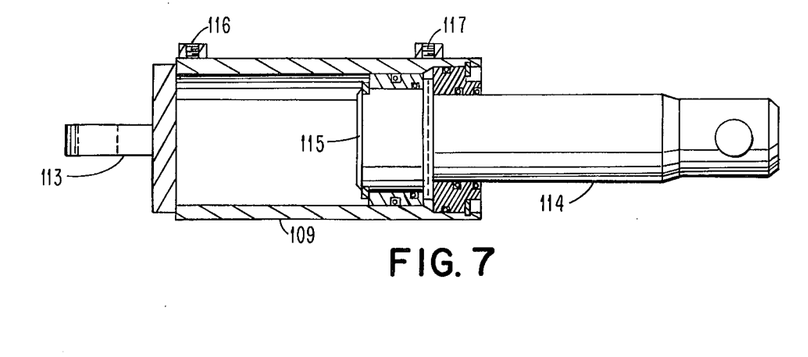
FIG. 7 is a sectional view of one of the double acting cylinders of the dog lowering mechanism of the present invention.

The double acting cylinder 109 has a piston rod 114 extending from a piston 115 (see FIG. 7). Hydraulic fluid can be selectively supplied to opposite sides of the piston 115 through fluid connections 116 and 117 to move the piston 115 in opposite directions.

The cylinder 109 is supported adjacent the piston rod 114 by a pair of retainers 118 (see FIGS. 1 and 3) and 119. The retainer 118 extends between the two side walls 103 and 104 of the frame 101 while the retainer 119 is secured to the top of the retainer 118 by bolts 120. Thus, the cylinder 109 is supported so that the piston rod 114 can move only substantially horizontally.

The piston rod 114 has a dog activating assembly 121 pivotally connected thereto by a pin 122. The assenbly 121 includes a carriage 123 having a pair of rollers 124 rotatably supported on opposite ends of the pin 122 and a second pair of rollers 125 rotatably supported on a pin 126.

The side wall 103 of the frame 101 has an upper track 127 (see FIG. 1) and a lower track 128, which is substantially parallel to the upper track 127, supported thereon with a longitudinal axis midway between the tracks 127 and 128 being aligned with the longitudinal axis of the cylinder 109. The track 128 has a first curved portion 129 extending downwardly from one end thereof. A second curved portion 130 is connected to the lower end of the first curved portion 129 and extends downwardly therefrom. The side wall 104 of the frame 101 has the same tracks 127 and 128 and the curved portions 129 and 130 mounted thereon.

When the piston rod 114 is fully retracted into the cylinder 109 as shown in FIG. 1, each of the rollers 125 is resting on one of the curved portions 130. As the piston rod 114 is extended from the cylinder 109, the rollers 125 ride up the curved portions 130 and the curved portions 129 until they are disposed between the tracks 127 and 128 and engage on the tracks 127 or 128. Continued extension of the piston rod 114 causes the rollers 124 to enter between the tracks 127 and 128.

Figure 8:
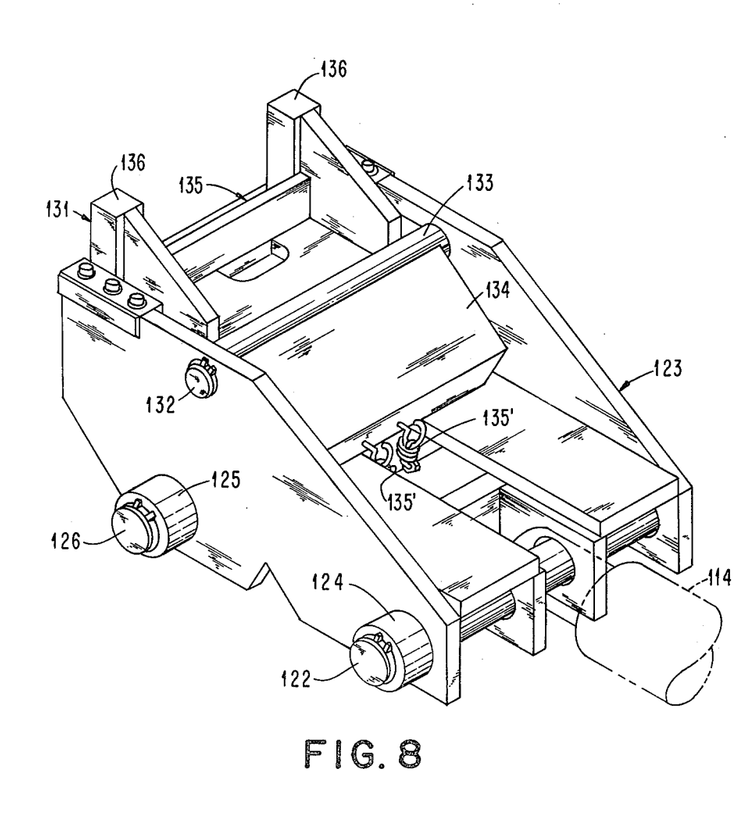
FIG. 8 is a perspective view of a dog activating assembly of th dog lowering mechanism of the present invention.

As shown in FIG. 8, the carriage 123 has a bumper assembly 131 pivotally mounted on an axle pin 132, which is supported by the carriage 123. The bumper assembly 131 includes a tube 133, which is rotatably supported by the pin 132, a plate 134, which is welded to the tube 133, and a bumper 135, which also is welded to the tube 133.

The plate 134 has a pair of springs 135' secured thereto and to the carriage 123 to continuously urge the bumper assembly 131 to the position in which a pair of posts 136 of the bumper 135 can engage pins 137 (see FIG. 1) and 138 (see FIG. 2) extending from the bell crank arms 52 and 53, respectively. Thus, when the dog activating assembly 121 is moved from the solid line position of FIG. 1 to the phantom line position of FIG. 1, the posts 136 will engage the pins 137 and 138 (see FIG. 2) to move the dog 50 (see FIG. 1) from the elevated or car engaging position of FIG. 1 to the non-obstructing position (phantom line position) of FIG. 1.

As shown in FIG. 3, a double acting cylinder 140 is disposed beneath the path along which the barney 39 (see FIG. 6) travels so that the cylinder 140 (see FIG. 3) can move a dog activating assembly 141 to which it is pivotally connected through its piston rod 142 to lower the dog 66 (see FIG. 6) of the barney 39. The structure for lowering the dog 66 of the barney 39 is the same as that for lowering the dog 50 of the barney 27.

When the piston rod 114 (see FIG. 1) is fully retracted within the cylinder 109 so that the dog activating assembly 121 is in the position shown in FIG. 1, a limit switch 143, which is mounted on the side wall 104 (see FIG. 3) of the frame 101, is engaged by the dog activating assembly 121. Similarly, when the piston rod 142 is fully retracted within the cylinder 140, a limit switch 144, which is mounted in the same manner as the limit switch 143, is engaged by the dog activating assembly 141.

Hydraulic fluid is supplied to the double acting cylinders 109 (see FIG. 4) and 140 from a pump 145, which also is driven by the motor 85. The pressurized fluid from the pump 45 is supplied through a line 146 to a solenoid controlled directional valve 147.

When a solenoid 148 is energized, the valve 147 is disposed so that the piston rods 114 and 142 are extended from the cylinders 109 and 140, respectively, by the hydraulic fluid from the pump 145. When a solenoid 149 is energized, the valve 147 is positioned so that hydraulic fluid is supplied from the pump 145 to the cylinders 109 and 140 to retract the piston rods 114 and 142, respectively. When retraction is complete, the dogs 50 (see FIG. 6) and 66 are moved to their elevated or car engaging positions.

When it is desired to lower the dogs 50 and 66 to their non-obstructing positions, a switch 150 (see FIG. 5) is moved into engagement with contacts 151 and 152 to connect the conductor 78 with a conductor 153. Then, the manual tram push button 75 must be closed to cause the barneys 27 (see FIG. 6) and 39 to be moved until the limit switch 71 is engaged by the barney 27. This is when the barney 27 is in its maximum retracted position.

The engagement of the limit switch 71 by the barney 27 results in normally open contacts 71-2 (see FIG. 5) of the limit switch 71 (see FIG. 6) closing. This energizes a latch coil 154 (see FIG. 5) of the latch relay 91 whereby the normally closed contacts 91-1 and 91-2 of the latch relay 91 open. Therefore, even if the opwerator continues to hold the tram push button 75 closed, the solenoids 88 and 89 cannot be energized because of the normally closed contacts 91-1 and 91-2 of the latch relay 91 being open. Accordingly, the barneys 27 (see FIG. 6) and 39 remain in the position in which the barney 27 engages the limit switch 71.

The energization of the latch coil 154 (see FIG. 5) of the latch relay 91 causes normally open contacts 91-3 of the latch relay 91 to close whereby the solenoid 148 is energized as long as a pressure switch 155 remains closed. the pressure switch 155 communicates with a hydraulic line 156 (see FIG. 4), which connects the cylinders 109 and 140 to the valve 147.

When the solenoid 148 is energized so that the valve 147 is disposed to connect the line 156 with the pump 145, the piston rods 114 and 142 of the cylinders 109 and 140, respectively, are extended by the pressurized fluid from the pump 145. When further extension of each of the piston rods 114 and 142 is prevented because of the dogs 50 (see FIG. 6) and 66, respectively, being in their non-obstructing or lowered positions, the pressure in the line 156 (see FIG. 4) will increase to cause the pressure switch 155 to open. This de-energizes the solenoid 148 so that the solenoid valve 147 returns to the position in which no fluid is supplied or removed from the cylinders 109 and 140.

The line 156 has an accumulator 157 connected thereto to maintain the piston rods 114 and 142 in their extended positions. Thus, any leakage between the valve 147 and the cylinders 109 and 140 will not result in the piston rods 114 and 142 ceasing to remain in their extended positions in which the dogs 50 (see FIG. 6) and 66 are in their lowered or non-obstructing positions.

The line 146 (see FIG. 4) has a pressure relief valve 158 therein to relieve pressure in the line 146 if it exceeds a pressure, which is substantially higher than that at which the pressure switch 155 opens. This insures that only the pressure switch 155 opens after the piston rods 114 and 142 have been extended to their positions in which the dogs 50 (see FIG. 6) and 66, respectively, are in their lowered or non-obstructing positions.

The dogs 50 and 66 will remain in their lowered or non-obstructing positions until the switch 150 (see FIG. 5) is moved from its dog lowering position in which the switch 150 engages the contacts 151 and 152 to a dog raising position in which contacts 159 and 160 are engaged by the switch 150. When the switch 150 is moved into engagement with the contacts 159 and 160, a circuit is completed through the solenoid 149 by either normally closed contacts 143-1 of the limit switch 143 (see FIG. 1) or normally closed contacts 144-1 of the limit switch 144 (see FIG. 3). The contacts 143-1 (see FIG. 5) of the limit switch 143 (see FIG. 1) close as soon as the dog activating assembly 121 ceases to engage the limit switch 143. Similarly, the contacts 144-1 (see FIG. 5) of the limit switch 144 (see FIG. 3) close as soon as the dog activating assembly 141 ceases to engage the limit switch 144.

Accordingly, energization of the solenoid 149 (see FIG. 4) moves the solenoid valve 147 to a position in which pressurized hydraulic fluid from the pump 45 is supplied to the cylinders 109 and 140 to retract the piston rods 114 and 142, respectively. The retraction of the piston rod 114 enables the spring 54 (see FIG. 1) to move the dog 50 of the barney 27 to its raised or car engaging position (solid line position of FIG. 1). The dog 66 (see FIG. 6) of the barney 39 is similarly raised as the piston rod 142 (see FIG. 3) is retracted into the cylinder 140.

When the dog activating assembly 121 (see FIG. 1) engages the limit switch 143, the normally closed contacts 143-1 (see FIG. 5) of the limit switch 143 (see FIG. 1) open. If the dog activating assembly 141 (see FIG. 3) has not yet engaged the limit switch 144, then the normally closed contacts 144-1 (see FIG. 5) of the limit switch 144 (see FIG. 3) enable the solenoid 149 (see FIG. 5) to remain energizing until the limit switch 144 (see FIG. 3) is engaged by the dog activating assembly 141. At this time, the normally closed contacts 144-1 (see FIG. 5) of the limit switch 44 (see FIG. 3) open so that the solenoid 149 (see FIG. ) is de-energized. Therefore, the solenoid 149 cannot be de-energized until both of the dogs 50 (see FIG. 6) and 66 are in their raised or car engaging positions.

When the limit switch 143 (see FIG. 1) is engaged by the dog activating assembly 121, normally open contacts 143-2 (see FIG. 5) of the limit switch 143 (see FIG. 1) close. Similarly, when the limit switch 144 (see FIG. 3) is engaged by the dog activating assembly 141, normally open contacts 144-2 (see FIG. 5) of the limit switch 144 (see FIG. 3) close. When both of the normally open contacts 143-2 (see FIG. 5) and 144-2 are closed, a release coil 161 of the latch relay 91 is energized. This causes the normally closed contacts 91-1 and 91-2 of the latch relay 91 to close and the normally open conacts 91-3 of the latch relay 91 to open.

The opening of the contacts 91-3 of the latch relay 91 prevents energization of the solenoid 148 until the switch 150 is returned to its dog lowering position in which the switch 150 connects the contacts 151 and 152. Thus, accidental shifting of the piston rods 114 (see FIG. 1) and 142 (see FIG. 3) is prevented.

The closing of the contacts 91-1 (see FIG. 5) and 91-2 of the latch relay 91 enables the barneys 27 (see FIG. 6) and 39 to again be shifted when the manual tram push button 75 (see FIG. 5) is moved to its closed position. However, this cannot occur until both of the piston rods 114 (see FIG. 3) and 142 have been fully retracted into their cylinders 109 and 140, respectively, because of the requirement for both the normally open contacts 143-2 (see FIG. 5) of the limit switch 143 (see FIG. 1) and the normally open conacts 144-2 (see FIG. 5) of the limit switch 44 (see FIG. 3) to be closed prior to the release coil 161 (see FIG. 5) of the latch relay 91 being energized. Therefore, no movement of the barneys 27 (see FIG. 6) and 39 can occur until the dogs 50 and 66 have been returned to their raised or car engaging positions.

Considering the operation of the present invention, the cars are advanced through moving the manual tram push button 75 (see FIG. 5) to its closed position and holding it in this position. This enables energization of one of the solenoids 88 and 89 depending on the positions of the barneys 27 (see FIG. 6) and 39 at this time. If the barneys 27 and 39 are in the position in which the barney 27 has engaged the limit switch 71, then the solenoid 89 (see FIG. 5) is energized. This is because the latch coil 92 of the latch relay 90 is energized due to the limit switch 71 (see FIG. 6) being engaged by the barney 27 so that the normally open contacts 71-1 (see FIG. 5) of the limit switch 71 (see FIG. 6) are closed. Energization of the latch coil 92 (see FIG. 5) of the latch relay 90 causes the normally closed contacts 90-1 of the latch relay 90 to open and the normally open contacts 90-2 of the latch relay 90 to close.

The energization of the solenoid 89 causes the barney 27 to advance and the barney 39 to retract. This continues until the sensing means 73 (see FIG. 69 on the barney 39 engages a wheel of a car, either the car being advanced or the next rearward car in the trip of cars being advanced, to cause closing of the normally open contacts 72-1 (see FIG. 5) of the limit switch 72 (see FIG. 69. When the contacts 72-1 (see FIG. 5) close, the release coil 93 of the latch relay 90 is energized whereby the normally closed contacts 90-1 of the latch relay 90 return to this state and the normally open contacts 90-2 of the latch relay 90 return to this state so that the solenoid 89 is de-energized and the solenoid 88 is energized. This results in the barney 39 (see FIG. 6) being advanced and the barney 27 being retracted.

When the last of the cars has been advanced, the barney 27 continues to advance until it engages the end limit switch 70 since the sensing means 73 cannot engage the wheel of a car during retraction of the barney 39 to cause the contacts 72-1 (see FIG. 5) of the limit switch 72 (see FIG. 6) to close. When the end limit switch 70 is engaged by the barney 27, the normally open contacts 70-1 (see FIG. 5) close, and the release coil 93 of the latch relay 90 is energized. This returns the normally closed contacts 90-1 of the latch relay 90 to this state and the normally open contacts 90-2 of the latch relay 90 to this state.

Then, if it is desired to lower the dogs 50 (see FIG. 6) and 66 to their non-obstructing positions, the switch 150 (see FIG. 5) is moved into engagement with the contacts 151 and 152. Until the limit switch 71 (see FIG. 6) is engaged by the barney 27, no lowering of the dogs 50 and 66 can occur. Therefore, it is necessary to move the manual tram push button 75 (see FIG. 5) to its closed position after the switch 150 has been moved into engagement with the contacts 151 and 152.

When the barney 27 (see FIG. 6) has engaged the limit switch 71 so that barney 27 is in its maximum retracted position, the normally open contacts 71-2 (see FIG. 5) of the limit switch 71 (see FIG. 6) close to cause energization of the latch coil 154 (see FIG. 59 of the latch relay 91. This causes the normally closed contacts 91-1 and 91-2 of the latch relay 91 to open so that neither the solenoid 88 nor the solenoid 89 can be energized even though the manual tram push button 75 is in its closed position.

Furthermore, the normally open contacts 91-3 of the latch relay 91 close to enable the solenoid 148 to be energized. This results in the piston rods 114 (see FIG. 3) and 142 being extended from the cylinders 109 and 140, respectively.

The extensions of the piston rods 114 and 142 cause the dog activating mechanisms 121 and 141, respectively, to move the dogs 50 (see FIG. 6) and 66 to their lowered or non-obstructing positions. When both of the dogs 50 and 66 are in their non-obstructing positions, no further extensions of the piston rods 114 (see FIG. 3) and 142 can occur. As a result, pressure in the hydraulic line 156 (see FIG. 4) increases to cause the pressure switch 155 to open whereby the solenoid 148 is de-energized. This stops the supply of hydraulic fluid to the cylinders 109 and 140 because of the solenoid valve 147 being returned to the position of FIG. 4.

When the dog activating assemblies 121 (see FIG. 3) and 141 cease to engage the limit switches 143 and 144, respectively, each of the normally closed contacts 143-1 (see FIG. 5) of the limit switch 143 (see FIG. 3) and the normally closed contacts 144-1 (see FIG. 5) of the limit switch 144 (see FIG. 3) returns to this state. This enables the solenoid 149 (see FIG. 5) to be energized whenever the switch 150 is moved by the operator into engagement with the contacts 159 and 160 to cause raising of the dogs 50 (see FIG. 6) and 66. Therefore, the dogs 50 and 66 can be returned to their car engaging positions any time that the switch 150 (see FIG. 5) is moved into engagement with the contacts 159 and 160 and does not require the piston rods 114 (see FIG. 3) and 142 to be fully extended. This enables interruption of the retraction of the dogs 50 (see FIG. 6) and 66 whenever desired.

Normally, the dogs 50 and 66 will not be moved from their lowered or non-obstructing positions to their raised or car engaging positions until the previously advanced cars have been retracted past the dogs 50 and 66. Then, at the time that a new trip of cars is available for advancing, the switch 150 (see FIG. 5) is moved out of engagement with the contacts 151 and 152 and into engagement with the contacts 159 and 160. This causes retraction of the piston rods 114 (see FIG. 3) and 142 into the cylinders 109 and 140, respectively, to return the dog activating assemblies 121 and 141, respectively, to the position shown in solid lines in FIG. 1 for the dog activating assembly 121. This enables the spring 54 to move the dog 50 to the raised or car engaging position of FIG. 1. A similar spring (not shown) causes raising of the dog 66 (see FIG. 6).

When both of the dog activating assemblies 121 (see FIG. 3) and 141 have been returned to the positions in which the limit switches 143 and 144 are engaged, then the barneys 27 (see FIG. 6) and 39 can be activated by moving the manual tram push button 75 (see FIG. 5) to its closed position and holding it in this position to advance one of the cars. This is because the engagement of the limit switches 143 (see FIG. 3) and 144 by the dog activating assemblies 121 and 141, respectively, causes the normally closed contacts 143-1 (see FIG. 5) of the limit switch 143 (see FIG. 1) and the normally closed contacts 144-1 (see FIG. 5) of the limit switch 144 (see FIG. 3) to open so that the solenoid 149 (see FIG. 5) cannot be energized. At the same time, the normally open contacts 143-2 of the limit switch 143 (see FIG. 1) and the normally open contacts 144-2 (see FIG. 5) of the limit switch 144 (see FIG. 3) are closed to energize the release coil 161 (see FIG. 5) of the latch relay 91 to cause the normally closed contacts 91-1 and 91-2 of the latch relay 91 to return to this state. Until the release coil 161 of the latch relay 91 is energized, there can be no energization of either the solenoid 88 or 89 to cause any movement of the barneys 27 (see FIG. 6) and 39.

An advantage of this invention is that it prevents accidental raising of the dogs from their non-obstructing positions. Another advantage of this invention is that the barneys can be disposed within a specified limited distance of about seventeen inches and the dogs can still be lowered. A further advantage of this invention is that it automatically stops application of hydraulic fluid when the dogs are completely lowered irrespective of the length of stroke of each of the piston rods moving the dogs. Still another advantage of this invention is that is prevents accidental raising of the dogs due to any leakage of hydraulic pressure. A still further advantage of this invention is that it prevents any movement of the barneys until the dogs have been fully raised and the dog activating assemblies fully retracted.

For purpose of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. In an apparatus for shifting a trip of cars along a predetermined path including first movable means and second movable means, each of said first movable means and said second movable means having engaging means for engaging a car to be shifted, means to control movement of said first movable means and said second movable means so that only one of said first movable means and said second movable means moves the car to be shifted at any time, the improvement comprising:

moving means to move said engaging means of each of said first movable means and said second movable means from a car engaging position to an inactive position in which said engaging means cannot be contacted by any car moving along the predetermined path;

and means to prevent movement of each of said first movable means and said second movable means unless said moving means is in a position in which said engaging means of each of said first movable means and said second movable means is in its car engaging position.

2. The improvement according to claim 1 in which said preventing means includes means to render said control means ineffective.

3. The improvement according to claim 1 in which said moving means includes first means to move said engaging means of said first movable means and second means to move said engaging means of said second movable means.

4. The improvement according to claim 3 in which said preventing means includes means to render said control means ineffective.

5. The improvement according to claim 3 in which each of said first moving means and said second moving means includes:

a double acting hydraulic cylinder;
   said cylinder having a piston rod extending therefrom;
   and causing means connected to said piston rod for causing movement of said engaging means to its inactive position when said piston rod is extended from said cylinder.

6. The improvement according to claim 5 including means to automatically stop the supply of hydraulic fluid to each of said cylinders when said engaging means of each of said first movable means and said second movable means is in its inactive position.

7. The improvement according to claim 6 in which said engaging means of each of said first movable means and said second movable means includes:
   a pivotally mounted dog for engaging the car to be shifted;
   and means to continuously urge said dog to its car engaging position.

8. The improvement according to claim 7 in which said preventing means includes means to render said control means ineffective.

9. The improvement according to claim 5 including means to automatically stop extension of said piston rod of each of said cylinders when said engaging means moved by said causing means is in its inactive position while holding said engaging means in its inactive position.

10. The improvement according to claim 5 in which said engaging means of each of said first movable means and said second movable means includes:
   a pivotally mounted dog for engaging the car to be shifted;
   and means to continuously urge said dog to its car engaging position.

* * * * *

UNITED STATES PATENT AND TRADEMARK OFFICE
CERTIFICATE OF CORRECTION

PATENT NO. : 4,252,064

DATED : February 24, 1981

INVENTOR(S) : Edward H. Ratcliff, Jr. et al

It is certified that error appears in the above—identified patent and that said Letters Patent is hereby corrected as shown below:

Column 2, line 47, "th" should read -- the --.

Column 3, line 9, "23" should read -- 24 --.

Column 4, line 57, "froma" should read -- from a --.

Column 4, line 66, "barnay" should read -- barney --.

Column 5, line 58, "99" should read -- 89 --.

Column 5, line 60, before "each" insert -- motion of --.

Column 6, line 30, "guies" should read -- guides --.

Column 6, line 62, "assenbly" should read -- assembly --.

Column 8, line 18, "opwera-" should read -- opera- --.

Column 8, line 29, "the" should read -- The --.

Column 9, line 11, "45" should read -- 145 --.

Column 9, line 27, "energizing" should read -- energized --.

Column 9, line 31 "(see FIG.)" should read -- (see FIG. 5) --.

Column 9, line 64, "44" should read -- 144 --.

UNITED STATES PATENT AND TRADEMARK OFFICE
CERTIFICATE OF CORRECTION

PATENT NO. : 4,252,064

DATED : February 24, 1981

INVENTOR(S) : Edward H. Ratcliff, Jr. et al

It is certified that error appears in the above—identified patent and that said Letters Patent is hereby corrected as shown below:

Column 10, line 20, "(see FIG. 69" should read -- (see FIG. 6) --

Column 10, line 25, "FIG. 69" should read -- FIG. 6) -- .

Column 10, line 55, after "that" insert -- the --.

Column 10, line 58, "(see FIG. 59" should read -- (see FIG. 5) --

Column 12, line 11, "is" should read -- it --.

Signed and Sealed this

Twenty-sixth Day of May 1981

[SEAL]

Attest:

RENE D. TEGTMEYER

Attesting Officer

Acting Commissioner of Patents and Trademarks